(12) United States Patent
Hwu et al.

(10) Patent No.: US 8,648,771 B2
(45) Date of Patent: Feb. 11, 2014

(54) DISPLAY DEVICE AND MULTI-DISPLAY APPARATUS

(75) Inventors: Keh Long Hwu, Hsin-Chu (TW); Kuo Feng Kao, Hsin-Chu (TW)

(73) Assignee: Au Optronics Corporation, Hsin-Chu (TW)

( * ) Notice: Subject to any disclaimer, the term of this patent is extended or adjusted under 35 U.S.C. 154(b) by 993 days.

(21) Appl. No.: 12/731,440

(22) Filed: Mar. 25, 2010

(65) Prior Publication Data

US 2010/0253591 A1  Oct. 7, 2010

(30) Foreign Application Priority Data

Apr. 3, 2009  (TW) .............................. 98111114 A (51) Int. Cl.
*G09G 5/00*  (2006.01)
(52) U.S. Cl.
USPC ............................................ 345/1.3; 345/1.1
(58) Field of Classification Search
USPC .................. 345/1.1, 1.3, 50; 349/95; 359/641
See application file for complete search history.

(56) References Cited

U.S. PATENT DOCUMENTS

| | | | | |
|---|---|---|---|---|
| 5,883,606 | A * | 3/1999 | Smoot ................................ | 345/7 |
| 6,014,232 | A * | 1/2000 | Clarke ........................... | 358/482 |
| 6,128,054 | A | 10/2000 | Schwarzenberger et al. | |
| 6,344,928 | B1 * | 2/2002 | Honguh et al. ................ | 359/621 |
| 6,623,126 | B2 * | 9/2003 | Sekiguchi et al. .............. | 353/62 |
| 6,809,470 | B2 * | 10/2004 | Morley et al. .................. | 313/500 |
| 7,173,761 | B2 * | 2/2007 | Yoshida ......................... | 359/457 |
| 7,784,954 | B1 * | 8/2010 | Coleman ........................ | 362/19 |
| 8,203,668 | B2 * | 6/2012 | Kamada ......................... | 349/65 |
| 2003/0231144 | A1 * | 12/2003 | Cho et al. ........................ | 345/1.3 |
| 2006/0238440 | A1 | 10/2006 | Kim et al. | |

FOREIGN PATENT DOCUMENTS

| | | |
|---|---|---|
| CN | 1467787 | 1/2004 |
| JP | 60-227233 | 11/1985 |
| JP | 02-010394 | 1/1990 |
| JP | 05-333331 | 12/1993 |
| JP | 11-258604 | 9/1999 |
| KR | 20040080114 | 9/2004 |
| TW | 200947080 | 11/2009 |

OTHER PUBLICATIONS

Dec. 25, 2009 Office Action for corresponding Chinese application that cites CN1467787 and US6128054, Dec. 25, 2009.

* cited by examiner

*Primary Examiner* — James Wozniak
*Assistant Examiner* — Calvin C Ma
(74) *Attorney, Agent, or Firm* — WPAT, P.C.; Anthony King (57) ABSTRACT

A display device comprises a display panel, an optical film and a convex lens. The display panel comprises a central axis, a display area, and a non-display area, wherein the non-display area is outside the region of the display area. The optical film is disposed near one side of the display panel and the convex lens is disposed near the other side of the display panel. The optical film comprises a microstructure configured to diverge incident light entered into the display panel and to redirect a portion of incident light near the border between the display area and non-display area to the non-display area. The convex lens is configured to converge the output light from the display panel and redirect the output light approximately parallel to the central axis.

20 Claims, 11 Drawing Sheets

———— vertical angle
------------ horizontal angle

FIG. 5

———— vertical angle
------------ horizontal angle

——— vertical angle
------- horizontal angle

FIG. 10

——— vertical angle
------- horizontal angle

DISPLAY DEVICE AND MULTI-DISPLAY APPARATUS

BACKGROUND OF THE INVENTION

1. Field of the Invention

The present invention relates to a display device and a multi-display apparatus, and relates more particularly to a display device capable of creating frameless visual effect and a multi-display apparatus having a wide viewing angle and ability to display seamlessly continuous images.

2. Description of the Related Art

With increasing needs of users to view informative visual content, a liquid crystal display device or an electronic device needs to be equipped with a liquid crystal screen capable of presenting plentiful information. However, electronic devices such as mobile devices are designed following the current trend of being light, thin, and small such that their usable spaces are limited. Such trend of miniaturization also seriously limits the utilization of large display screens. In order not to seriously affect the ease of reading displayed contents and not to cause a user's eyes to easily get tired, electronic devices with folding or sliding multi-display screens are being developed. However, a portion of the peripheral side edge surfaces of liquid crystal display screens is usually occupied with a frame sealant for sealing. As a result, the frame sealant constitutes a non-display area, decreasing available display area of the display screen, and causing the fragmentation of the display images displayed on a multi-display screen. To deal with such issue, techniques for seamless or frameless display of the tiled images of a multi-display screen are gradually being developed.

Figure 1:
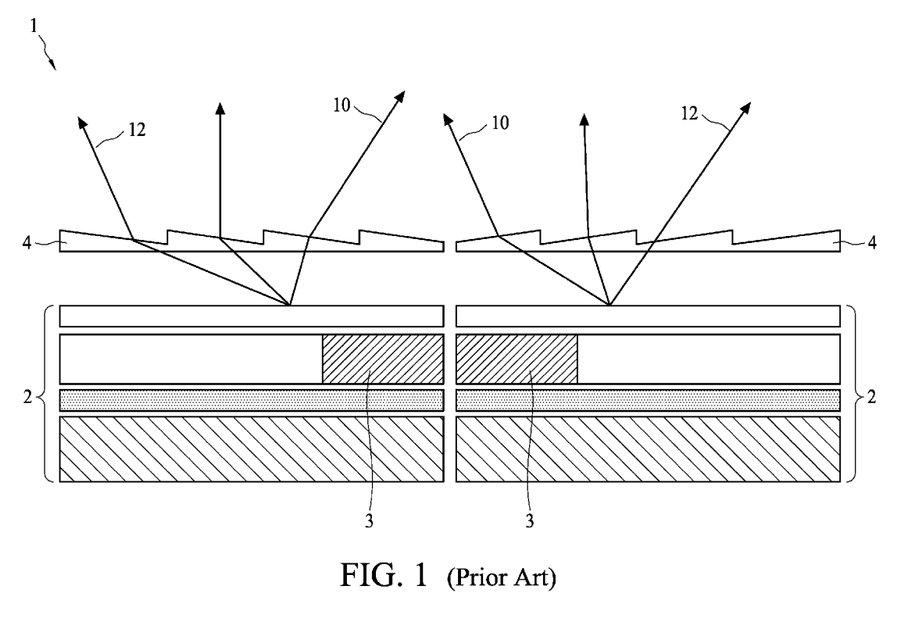
FIG. 1 shows a traditional multi-display device.

FIG. 1 shows a traditional multi-display device 1. A traditional multi-display device 1 includes a plurality of display units 2 each having a non-display area 3, the existence of which causes discontinuous display images to be shown on the multi-display device 1. In order to remove the common boundaries caused by the non-display area 3 between the display images, a magnifying element 4 is applied to magnify each separate display image so as to combine these display images together, resulting in a seamlessly combined display image.

Figure 2:
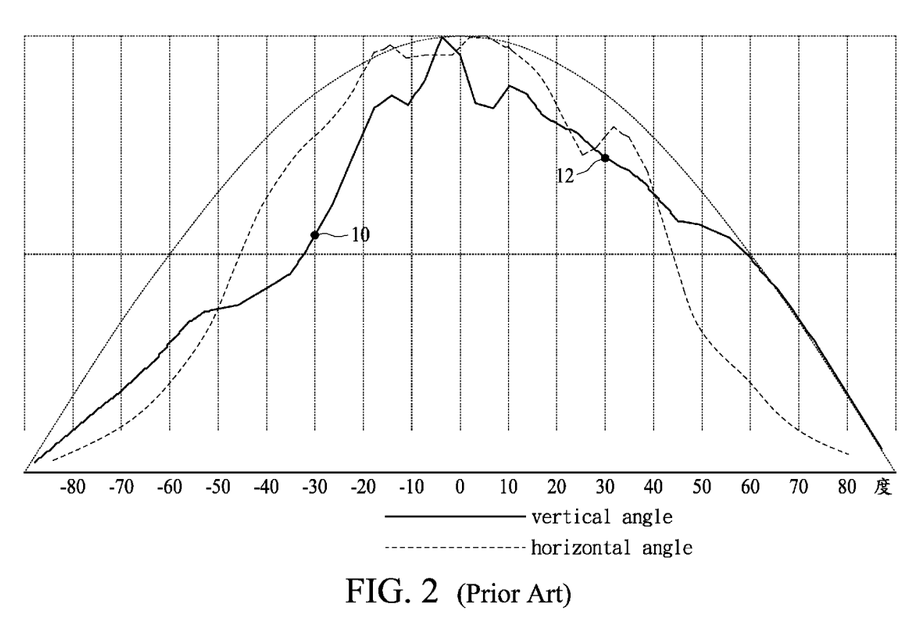
FIG. 2 is a diagram showing the angular light intensity distribution of the traditional multi-display device of FIG. 1.

However, the method using a magnifying element 4 may cause each display unit 2 to have skewed distributions of light intensity. For example, the magnifying element 4 refracts light emitted from each display unit 2, causing the intensity of the light at the viewing angle of 30 degrees (12) to differ from that of light at the viewing angle of minus 30 degrees (10) as shown in FIG. 2. Moreover, the difference of light intensity increases as the viewing angle increases. Such light intensity difference limits the viewing angles of the multi-display device 1.

Thus, traditional multi-display devices have quality issues, and therefore solutions for such issues are required.

SUMMARY OF THE INVENTION

The present invention provides a display device and a multi-display apparatus. The display device includes an optical film disposed on one side of a display panel for diverging incident light and a convex lens disposed on another side of the display panel for converging output light so that the display device can create a borderless visual effect and achieve wide viewing angles. The multi-display apparatus adopts the similar arrangement so as to create large, wide-angled and continuous display images.

One embodiment of the present invention provides a display device, which comprises a display panel, an optical film, and a convex lens. The display panel comprises a central axis, a display area and a non-display area disposed outside the display area. The optical film is disposed near one side of the display panel, while the convex lens is disposed near the other side of the display panel. The optical film includes a microstructure configured to diverge the incident light into the display panel so that a portion of the incident light near the border between the display area and the non-display area is redirected to travel over the non-display area. The convex lens includes a Fresnel structure, configured to converge the output light from the display panel so that the output light is redirected to travel approximately parallel to the central axis.

One embodiment of the present invention provides a multi-display apparatus, which comprises a plurality of display devices disposed adjacent to each other on a plane. Each display device comprises the above display panel, the above optical film, and the above convex lens.

BRIEF DESCRIPTION OF THE DRAWINGS

The invention will be described according to the appended drawings in which.

DETAILED DESCRIPTION OF THE INVENTION

Figure 3:
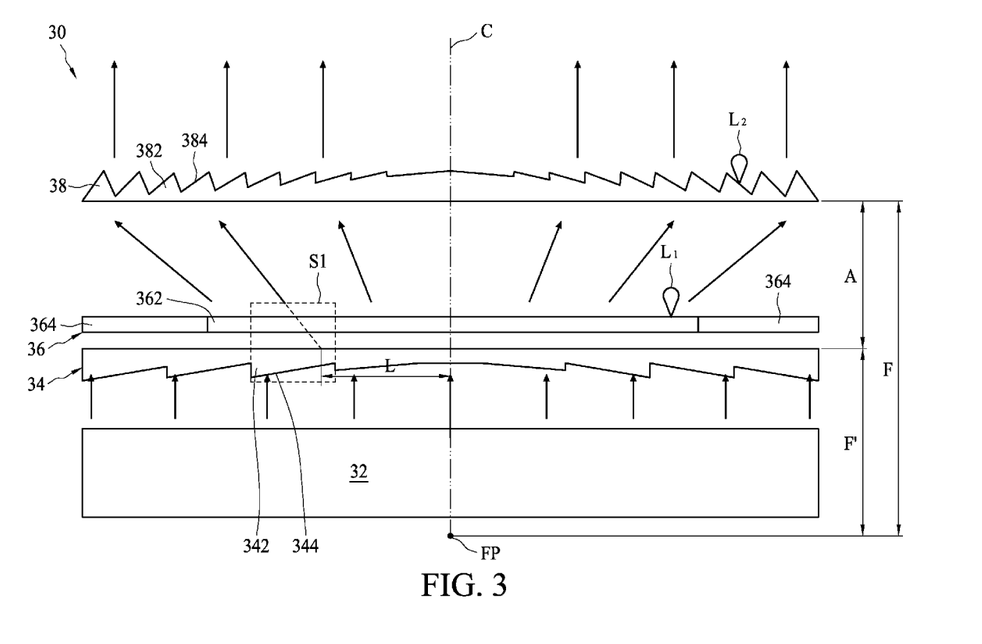
FIG. 3 is a cross-sectional view showing a display device according to one embodiment of the present invention.

FIG. 3 is a cross-sectional view showing a display device 30 according to one embodiment of the present invention. The present invention proposes a display device 30 comprising a backlight module 32, an optical is film 34, a display panel 36, and a convex lens 38. The backlight module 32 is configured to be a light source for illumination of display. The display panel 36 having a central axis C comprises a display area 362 and a non-display area 364 disposed outside the display area 362. The optical film 34 is disposed near one side of the display panel 36, namely the light-entry side of the display panel 36, and is between the display panel 36 and the backlight module 32. The optical film 34 can be combined with the display panel 36, or disposed in the backlight module 32. The optical film 34 can be, for example, a Fresnel concave lens, with a microstructure 342 disposed thereon for diverging incident light into the display panel 36 so that a portion of the incident light near the border between the display area 362 and the non-display area 364 can be redirected over the non-display area 364.

The convex lens 38 is disposed on the other side of the display panel 36, namely, the light output side of the display panel 36. In other words, the convex lens 38 is disposed on the side away from the backlight module 32. The convex lens 38 can be, for example, a Fresnel convex lens. Additionally, the convex lens 38 can include a Fresnel structure 382 correspondingly and symmetrically disposed about the central axis C of the display panel 36 and configured for converging the output light from the display panel 36. The output light can be redirected to travel approximately parallel to the central axis C of the display panel 36 after it passes through the convex lens 38 as shown in FIG. 3.

In the present embodiment, the microstructure 342 of the optical film 34, as shown in FIG. 3, is disposed on the surface facing away from the display panel 36, and the other opposite surface of the optical film 34, facing the display panel 36, is a planar surface. The Fresnel structure 382 of the convex lens 38 is disposed on the surface facing away from the display panel 36, and the opposite surface is a planar surface.

In the present embodiment, the Fresnel structure 382 of the convex lens 38 includes a plurality of second inclined surfaces 384 concentrically and symmetrically disposed about and facing away from the central axis C, and the tilt angles of the second inclined surfaces 384 relative to the horizontal plane of the convex lens 38 increase along the direction from the central axis C outward. The angles of the plurality of second inclined surfaces 384 relative to the horizontal plane of the convex lens 38 are substantially in the range of from 0 to 60 degrees, and are preferably in the range of from 0 to 40 degrees. Furthermore, as shown in FIG. 3, the angle of the second inclined surface 384 adjacent to the central axis C may be zero degrees, i.e., a planar surface, or such angle of the second inclined surface 384 may be other than zero degrees.

Preferably, the optical film 34 has a focal length F' and its virtual focus is located proximal to Point FP; the convex lens 38 has a focal length F and its focus is also located proximal to Point FP. Namely, such a structure arrangement makes the virtual focus of the optical film 34 coincide with the focus of the convex lens 38. In other words, light is refracted when it passes through the microstructure 342 of the optical film 34, the refracted light travels as if it were emitted from Point FP, and as the refracted light passes through the Fresnel structure 382 of the convex lens 38, the refracted light is refracted again to travel approximately parallel with the central axis C. As such, the images shown on the display panel 36 can be magnified.

Figure 4:
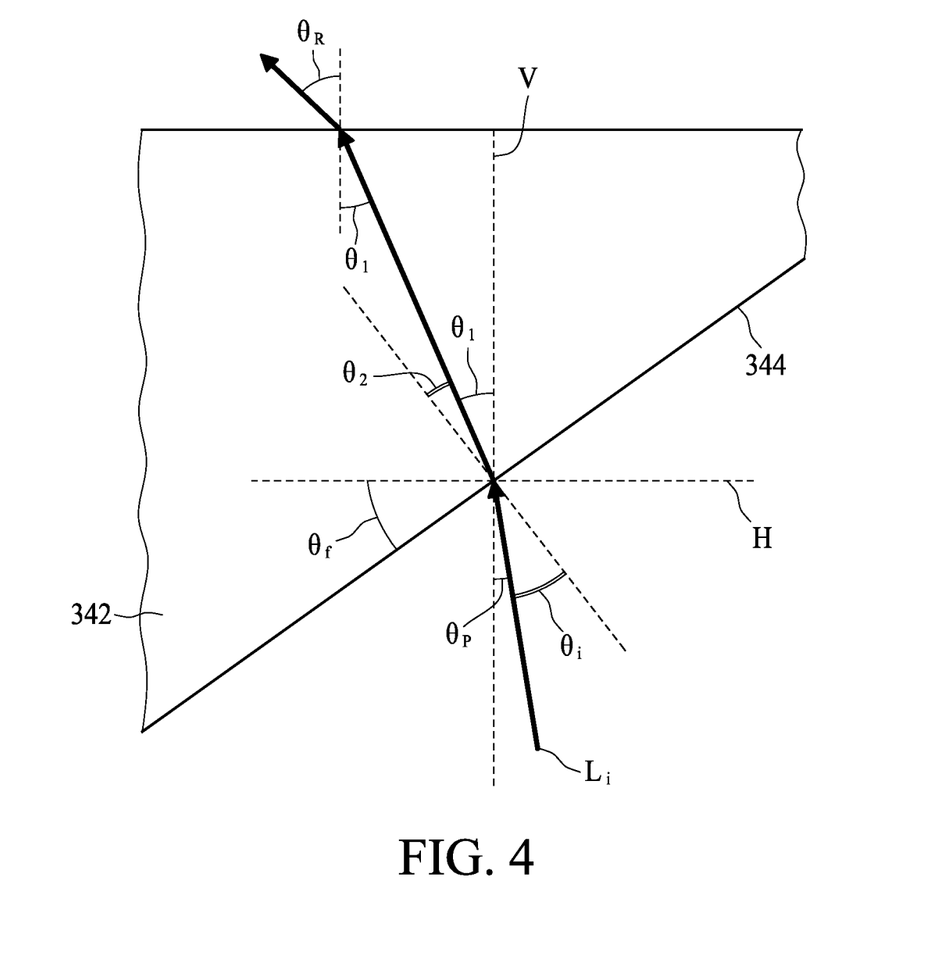
FIG. 4 is the partially enlarged view of the enclosure S1 of FIG. 3.

FIG. 4 is the partially enlarged view of the enclosure S1 of FIG. 3. Referring to FIGS. 3 and 4, the microstructure 342 of the optical film 34 comprises a plurality of first inclined surfaces 344 concentrically and symmetrically disposed about the central axis C of the display panel 36. The plurality of first inclined surfaces 344 face toward the central axis C, and the angles of the first inclined surfaces 344 relative to the horizontal plane of the convex lens 38 increase along the direction from the central axis outward. The angles of the plurality of first inclined surfaces 344 relative to the horizontal plane of the convex lens 38 are substantially in the range of from 0 to 60 degrees, and are preferably in the range of from 0 to 40 degrees. In order to make incident light appear to originate from the virtual focus of the optical film 34, the refraction angle $\theta_R$ of light leaving the planar surface of the optical film 34 shall conform to the following equation (1):

$$\tan\theta_R = \frac{L}{F - A} \tag{1}$$

where L is the distance measured between the location of the light leaving the optical film 34 and the central axis C, F is the focal length of the convex lens 38, and A is the distance between the optical film 34 and the convex lens 38.

The angle $\theta_f$ of each first inclined surface 344 relative to the H axis that parallel to the horizontal plane of the convex lens 38 can be calculated using equation (1) and the following equations (2), (3) and (4):

$$n_{air} \times \sin\theta_R = n \times \sin\theta_1 \tag{2}$$

$$n_{air} \times \sin\theta_i = n \times \sin\theta_2 \tag{3}$$

$$\theta_f = \theta_1 + \theta_2 \tag{4}$$

where $n_{air}$ is the refractive index of air, n is the refractive index of the optical film 34, $\theta_i$ is the first incident angle of light entering the first inclined surface 344, $\theta_2$ is the first refraction angle of light refracted through the first inclined surface 344, and $\theta_1$ is the second incident angle of light incident on the planar surface of the optical film 34.

The following equation can be derived from equations (1) and (2):

$$\theta_1 = \sin^{-1}\left(\frac{n_{air}}{n} \frac{L}{\sqrt{L^2 + (F - A)^2}}\right) \tag{5}$$

Referring to FIG. 4, assume that the included angle between an incident beam and the V axis is designated $\theta_p$, and the following equation (6) can be derived according to FIG. 4:

$$\theta_i + \theta_p = \theta_1 + \theta_2 \tag{6}$$

Assuming that the light source producing incident light rays is ideal, the incident light rays are parallel so that $\theta_p = 0$. Under such an assumption, an equation for calculating $\theta_f$ can be derived using equations (3), (4) and (6):

$$\theta_f = \sin^{-1}\left(\frac{n_{air}}{n} \frac{L}{\sqrt{L^2 + (F - A)^2}}\right) + \tan^{-1}\left(\frac{n_{air}\sin(\theta_1)}{n - n_{air}\cos\theta_1}\right) \tag{7}$$

where $\theta_1$ can be calculated using equation (5).

Figure 5:
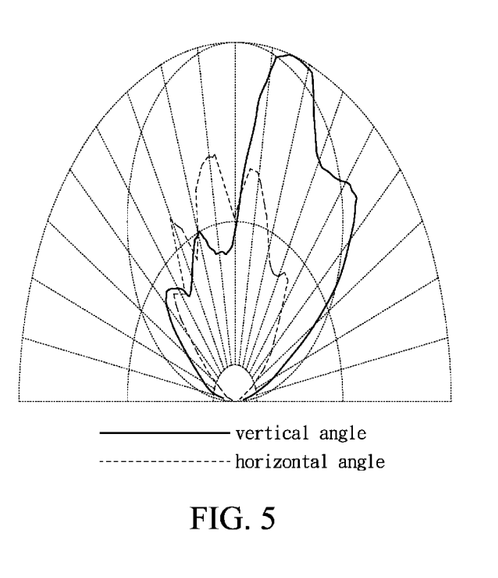
FIG. 5 is a diagram showing the angular distribution of light intensity at the location $L_1$ on the display panel of the display device of FIG. 3.
Figure 6:
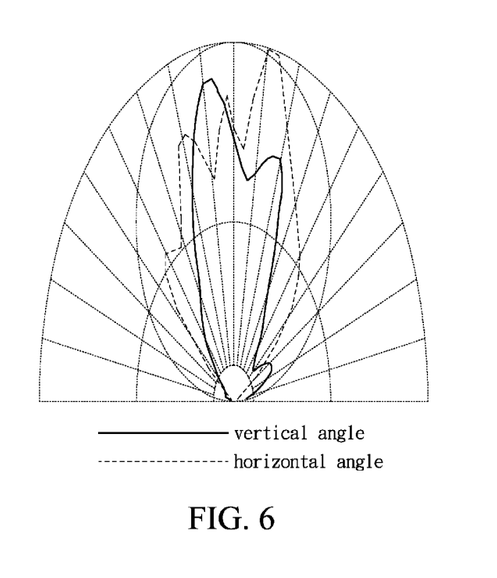
FIG. 6 is a diagram showing the angular distribution of light intensity at the location $L_2$ on the convex lens of the display device of FIG. 3.

Referring to FIG. 3, FIG. 5 and FIG. 6, the microstructure 342 of the optical film 34 can diverge at least a portion of the incident light onto the display panel 36 such that a portion of the incident light near the border between the display area 362 and the non-display area 364 is redirected to travel over the non-display area 364. Because the incident light is refracted in advance, the angular distribution of light intensity of the output light from the display panel 36 is asymmetrical. Specifically, the angular distribution of light intensity at the location $L_1$ in the display area 362 and close to the non-display area 364 is more significantly asymmetrical, as shown in FIG. 5. The output light from the display panel 36 is refracted again when it passes through the convex lens 38. Because the optical film 34 and the convex lens 38 are complementary, similar to a complementary pair of a concave lens and a convex lens, angular distribution of light intensity, for example, measured at location $L_2$, above the non-display area 364 of the display panel 36, on the convex lens can be symmetrical as shown in FIG. 6. Therefore, the microstructure 342 of the optical film 34 of the present invention when used in combination with the Fresnel structure 382 of the convex lens 38 can magnify display images such that the display device 30 appears as if it is borderless. Taking advantage of an optical film 34 and a convex lens 38, the arrangement of which are similar to complementary convex and concave lenses, can make the angular distribution of light intensity measured on the convex lens 38 appear symmetrical. In addition, the optical film 34 and the convex lens 38 are respectively a Fresnel concave lens and a Fresnel convex lens so that the optical film 34 and the convex lens 38 have low thickness. Moreover, the optical film 34 and the convex lens 38 are respectively disposed on two opposite sides of the display panel 36. Light only needs to travel a short distance A between the optical film 34 and the convex lens 38 to achieve the required magnification effect, and then is converged when it passes through the convex lens 38. Therefore, the total thickness of the display device 30 is nearly unaffected.

Figure 7:
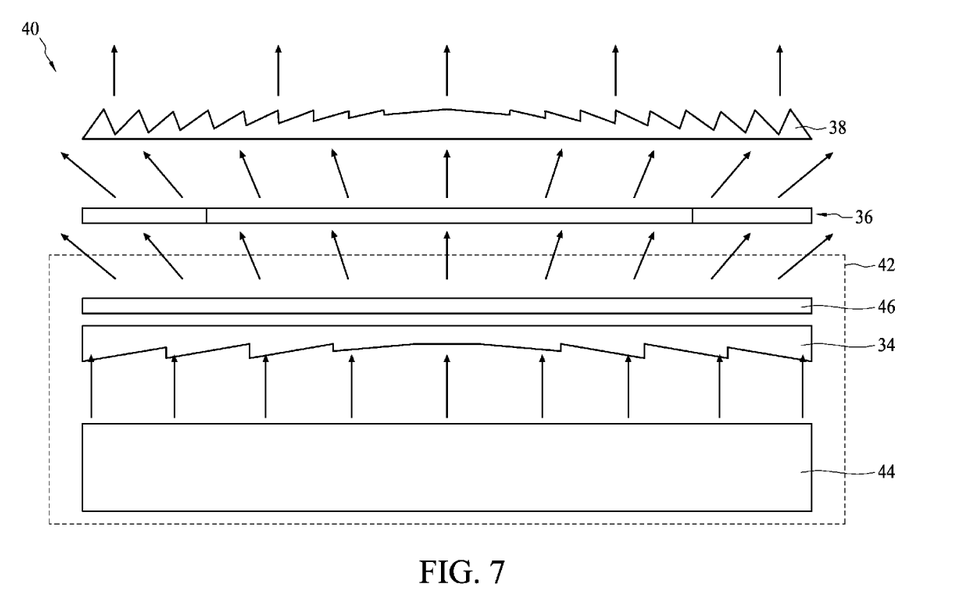
FIG. 7 is a cross-sectional view showing a display device according to another embodiment of the present invention.

FIG. 7 is a cross-sectional view showing a display device 40 according to another embodiment of the present invention. Referring to FIGS. 3 and 7, the display device 40 of another embodiment of the present invention comprises a backlight module 42, a display panel 36, and a convex lens 38. The display panel 36 is disposed on the backlight module 42, and the convex lens 38 is disposed on the display panel 36. The backlight module 42 comprises a light source 44, an optical film 34, and a light diffusion film 46. The optical film 34 is disposed between the light diffusion film 46 and the light source 44. Specifically, the optical film 34 is disposed on the light source 44 and the light diffusion film 46 is disposed on the optical film 34 so as to avoid moiré interference. Similarly, the combination of the microstructure 342 of the optical film 34 and the Fresnel structure 382 of the convex lens 38 can magnify display images so as to achieve a borderless display effect.

Figure 8:
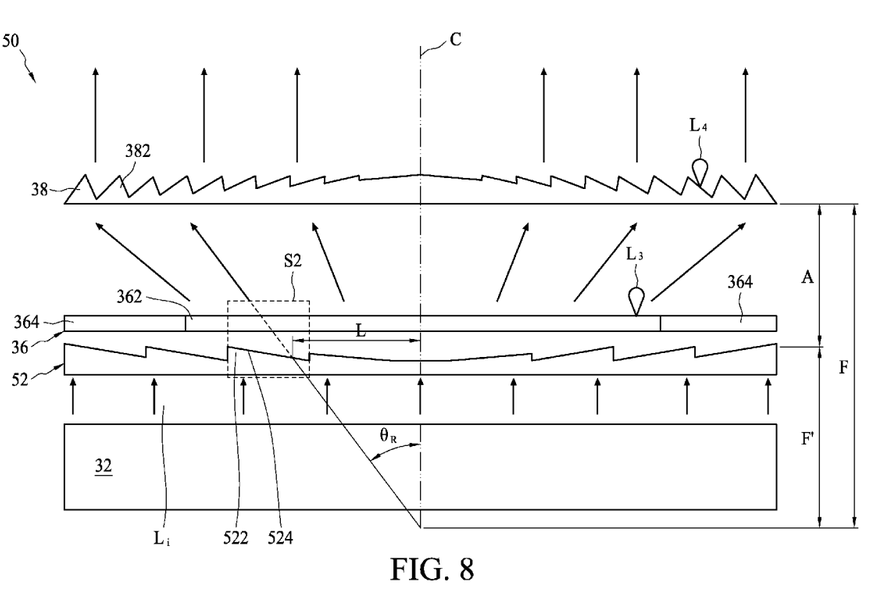
FIG. 8 is a cross-sectional view showing a display device according to another embodiment of the present invention.

FIG. 8 is a cross-sectional view showing a display device 50 according to another embodiment of the present invention. The display device 50 of this embodiment is similar to the display device 30 shown in FIG. 3. The only difference is that the display device 50 includes an optical film 52 having a microstructure 522 disposed on the side facing toward the display panel 36, and the opposite side is a planar surface. Similarly, the optical film 50 diverges a portion of light incident on the display panel 36, and the convex lens 38 converges the light emanated from the display panel 36. In the present embodiment, the Fresnel structure 382 of the convex lens 38 is disposed on the side facing away from the display panel 36, and the Fresnel structure 382 is arranged symmetrically with respect to the central axis C of the display panel 36, and the opposite side of the convex lens 38 is planar. In another embodiment, the Fresnel structure 382 can be disposed on the side of the convex lens 38 that facing the display panel 36, and the opposite side is planar.

Figure 9:
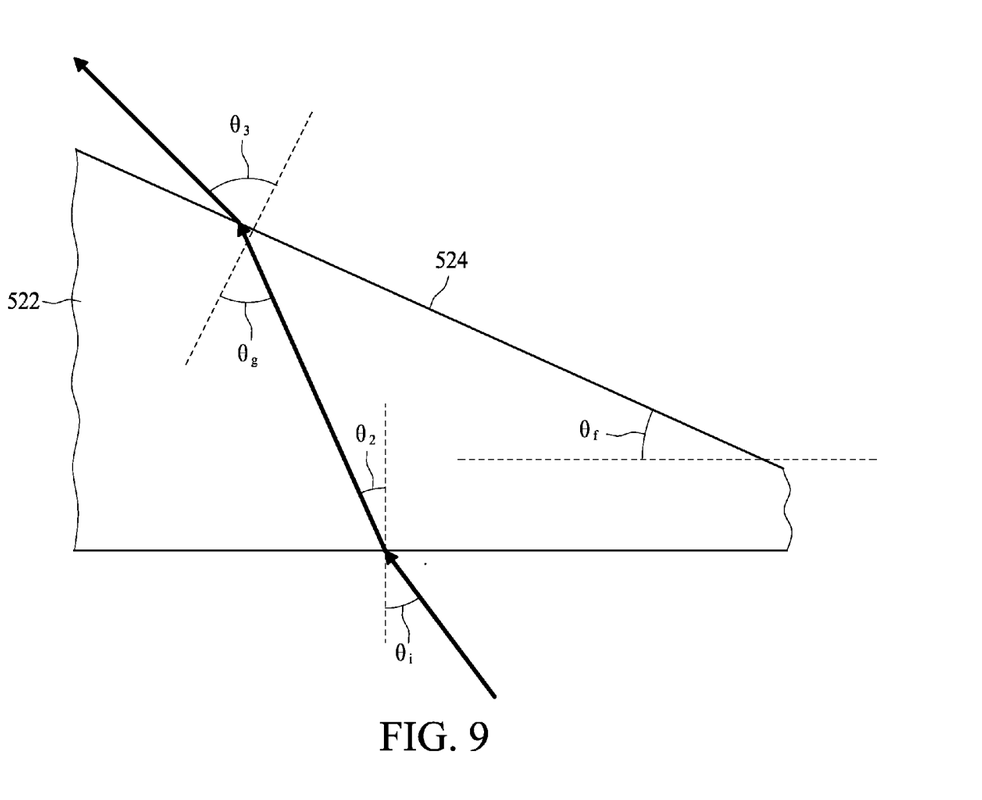
FIG. 9 is an enlarged view in a partial section taken generally from Rectangle S2 of FIG. 8.

FIG. 9 is an enlarged view in a partial section taken generally from Rectangle S2 of FIG. 8. Referring to FIGS. 8 and 9, the microstructure 522 of the optical film 52 comprises a plurality of first inclined surfaces 524 concentrically and symmetrically disposed about the central axis C of the display panel 36. The plurality of first inclined surfaces 344 face toward the central axis C, and the angles of the first inclined surfaces 344 relative to the horizontal plane of the convex lens 38 increase along the direction from the central axis outward. In order to make incident light appear to originate from the virtual focus of the optical film 52, the refraction angle $\theta_R$ of light leaving the planar surface of the optical film 52 shall conform to the following equation (8):

$$\tan\theta_R = \frac{L}{F - A} \tag{8}$$

where L is the distance measured between the location of the light leaving the optical film 52 and the central axis C, F is the focal length of the convex lens 38, and A is the distance between the optical film 52 and the convex lens 38.

The angle $\theta_f$ of each first inclined surface 524 relative to the H axis that parallel to the horizontal plane of the convex lens 38 can be calculated using equation (8) and the equations (9), (10), (11) and (12) as follows:

$$n_{air} \times \sin\theta_3 = n \times \sin\theta_g \tag{9}$$

$$n_{air} \times \sin\theta_i = n \times \sin\theta_2 \tag{10}$$

$$\theta_3 = \theta_R + \theta_f \tag{11}$$

$$\theta_g = \theta_2 + \theta_f \tag{12}$$

where $n_{air}$ is the refractive index of air, n is the refractive index of the optical film 52, $\theta_i$ is the first incident angle of light entering the planar is surface of the convex lens 38, $\theta_2$ is the first refraction angle of light refracted from the planar surface of the convex lens 38, $\theta_g$ is the second incident angle of light entering the first inclined surface 524, $\theta_3$ is the second refraction angle of light leaving the first inclined surface 524, and $\theta_R$ is the included angle between the traveling direction of light leaving the first inclined surface 524 and the central axis C.

Using equations (8) and (9), equation (13) can be derived:

$$\tan\theta_f = \left( \frac{\frac{n_{air}}{n}\sin\theta_R - \sin\theta_2}{\cos\theta_2 - \frac{n_{air}}{n}\cos\theta_R} \right) \tag{13}$$

Similarly, assume that the light source producing incident light rays is ideal, and $\theta_i$ and $\theta_2$ are 0 degrees. For now, the following equation can be derived using equations (10), (11) and (12):

$$\tan\theta_f = \left( \frac{\frac{n_{air}}{n}\sin\theta_R}{1 - \frac{n_{air}}{n}\cos\theta_R} \right) \tag{14}$$

Using equation (14), the angle of each first inclined surface 524 can be calculated.

Figure 10:
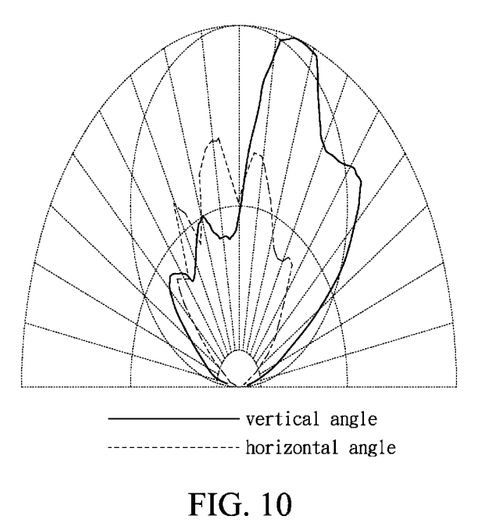
FIG. 10 is a diagram showing the angular distribution of light intensity at the location $L_3$ on the display panel of the display device of FIG. 8.
Figure 11:
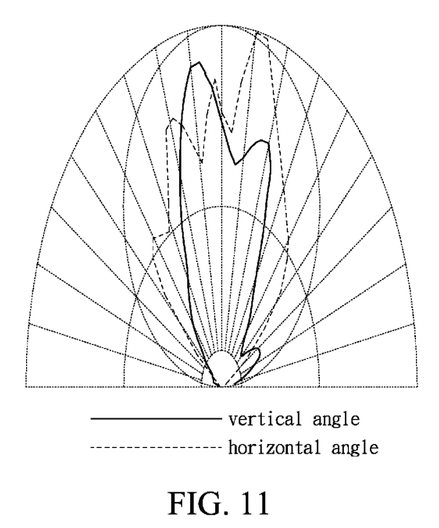
FIG. 11 is a diagram showing the angular distribution of light intensity at the location $L_4$ on the convex lens of the display device of FIG. 8.

Referring to FIGS. 8, 10 and 11, as analogous to the embodiment shown in FIG. 3, the angular light intensity distribution of incident light from a backlight module 32 on the display panel 36 is asymmetrical due to the refraction by the optical film 52. In particular, the location $L_3$ in the display area 362 and adjacent to the non-display area 364 has a more badly-affected condition, as shown in FIG. 10. Similarly, the output light from the display panel 36 is further refracted by the convex lens 38, and because the optical film 52 and the convex lens 38 are complementary, the angular distribution of light intensity, for example, measured at location $L_4$, above the non-display area 364 of the display panel 36, can be symmetrical as is shown in FIG. 11. It can be seen that even though the microstructure 522 of the optical film 50 is disposed facing the display panel 36, the result is the same as that of the embodiment of FIG. 3.

Preferably, the optical film 34 and 52 can be Fresnel concave lens. Namely, the microstructures 342 and 522 of the optical films 34 and 52 can be Fresnel microstructures. The pitches of the microstructures 342 and 522 can be in the range of from 10 to 50 micrometers. The pitches of the Fresnel microstructures 382 of the convex lens 38 can be in the range of from 10 to 50 micrometers. Furthermore, although the microstructures 342 and 522 of the optical films 34 and 52 have different pitches, namely each repeating unit of the microstructures 342 and 522 disposed correspondingly to multiple repeating units of the Fresnel structure 382, compared to the microstructure 382 in some figures of the disclosure, the microstructures 342 and 522 of the optical film 34 and 52 can have a pitch the same as that of the Fresnel structure 382, and in other words, each repeating unit of the microstructure 342 or 522 is disposed correspondingly to a single repeating unit of the Fresnel structure 382.

Figure 12:
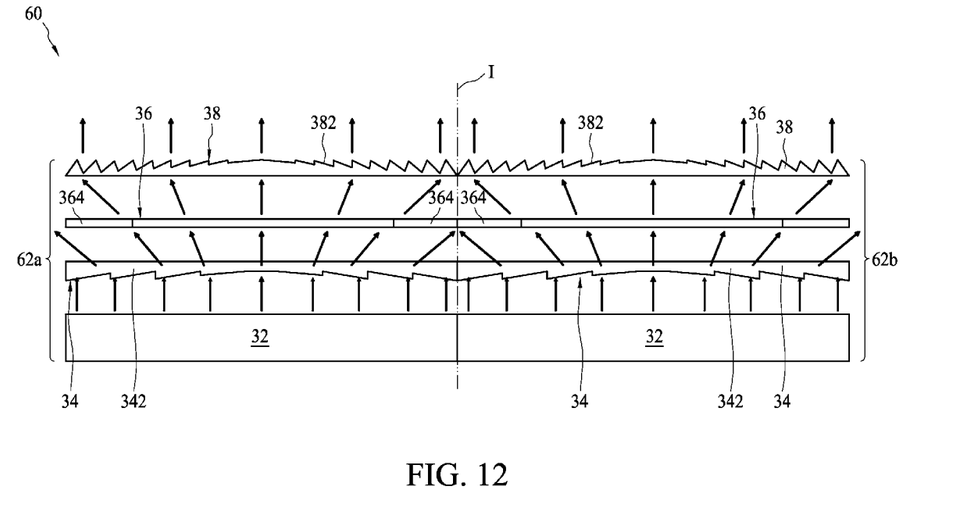
FIG. 12 is a cross-sectional view showing a structure of a multi-display apparatus according to one embodiment of the present invention.

FIG. 12 is a cross-sectional view showing a structure of a multi-display apparatus 60 according to one embodiment of the present invention. The multi-display apparatus 60 comprises a plurality of display devices 62a and 62b disposed adjacent to each other on a plane. Each of the display devices 62a and 62b comprises, as shown in FIG. 3, a backlight module 32, an optical film 34, a display panel 36 and a convex lens 38. The optical film 34 includes a microstructure 342 facing away from the display panel 36; the convex lens 38 includes a Fresnel structure 382 facing away from the display panel 36. The display devices 62a and 62b utilize the optical films 34 to refract the light entering the display panel 36 so as to magnify their display images to extend the display images over the non-display areas 364 of the display device 62a and 62b, and further to connect their display images at the common boundary I of the display device 62a and 62b to become a large continuous display image. Each of the display devices 62a and 62b combines the optical film 34 and the convex lens 38 to obtain symmetrically angular light intensity distribution, to increase viewing angles, and to increase display quality.

Figure 13:
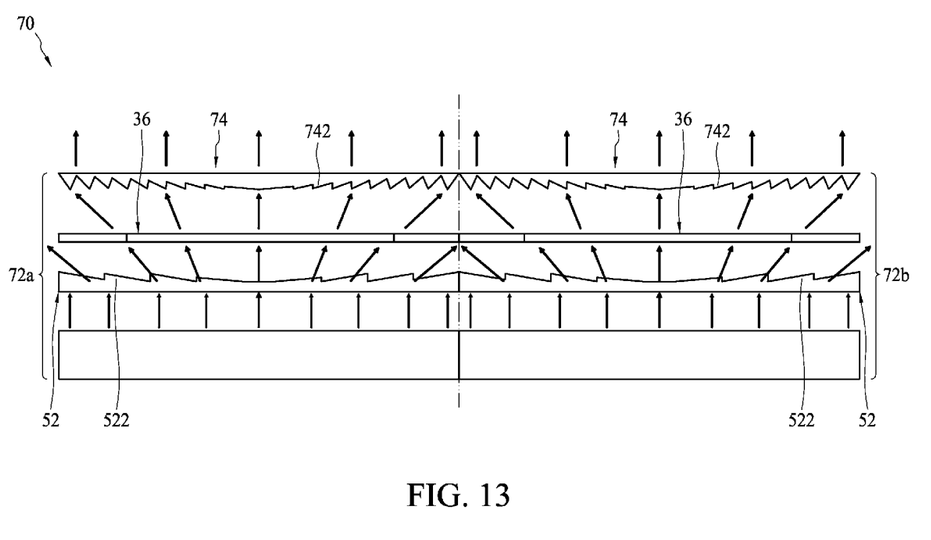
FIG. 13 is a cross-sectional view showing a structure of a multi-display apparatus according to another embodiment of the present invention.

FIG. 13 is a cross-sectional view showing a structure of a multi-display apparatus 70 according to another embodiment of the present invention. The multi-display apparatus 70 has a structure similar to that of the multi-display apparatus 60 in FIG. 12 except that the microstructure 522 of the optical film 52 of each display device 72a or 72b faces toward the display panel 36 and the Fresnel structure 742 of the convex lens 74 faces toward the display panel 36. The display devices 72a and 72b utilize the optical films 52 and the convex lens 74 to achieve high quality continuous display images.

The above-described embodiments of the present invention are intended to be illustrative only. Numerous alternative embodiments may be devised by persons skilled in the art without departing from the scope of the following claims.

What is claimed is:
1. A display device, comprising:
a display panel comprising a central axis, a display area and a non-display area disposed outside the display area;
an optical film disposed near one side of the display panel, the optical film comprising a microstructure configured to diverge the incident light into the display panel thereby a portion of the incident light near the border between the display area and the non-display area is redirected to travel over the non-display area; and
a convex lens disposed near the other side of the display panel, the convex lens comprising a Fresnel structure and being configured to converge the output light from the display panel thereby the output light is redirected to travel approximately parallel to the central axis;
wherein the microstructure comprising a plurality of first inclined surfaces is formed on a surface of the optical film facing away from the display panel and a planar surface is disposed on the other opposite surface of the optical film, and tilt angles $\theta_f$ of the plurality of the first inclined surfaces are determined using the following equation:

$$\tan\theta_R = \frac{L}{F - A}$$
$$n_{air} \times \sin\theta_R = n \times \sin\theta_1$$
$$n_{air} \times \sin\theta_i = n \times \sin\theta_2$$
$$\theta_f = \theta_1 + \theta_2$$

where $n_{air}$ is the refractive index of air, n is the refractive index of the optical film, L is a distance measured between a location of light leaving the optical film and the central axis, F is the focal length of the convex lens, A is a distance between the optical film and the convex lens, $\theta_i$ is a first incident angle of light entering the first inclined surface, $\theta_2$ is a first refraction angle of light refracted through the first inclined surface, $\theta_1$ is a second incident angle of light incident on the planar surface, and $\theta_R$ is a second refraction angle of light refracted through the planar surface.

2. The display device of claim 1, wherein the optical film is a Fresnel concave lens.

3. The display device of claim 2, wherein the optical film comprises a virtual focus, and the convex lens comprises a focus, wherein the virtual focus is substantially coincident with the focus.

4. The display device of claim 1, wherein a pitch of the microstructure is in the range of from 10 to 50 micrometers, and a pitch of the Fresnel structure is in the range of from 10 to 50 micrometers.

5. The display device of claim 1, further comprising a backlight module having a diffusion film and a light source, wherein the optical film is within the backlight module and is between the diffusion film and the light source.

6. The display device of claim 1, wherein the microstructure comprises a plurality of first inclined surfaces concentrically disposed about and facing toward the central axis of the display panel, and tilt angles of the plurality of the first inclined surfaces relative to a horizontal plane of the optical film increase along a direction from the central axis outward.

7. The display device of claim 1, wherein the Fresnel structure is symmetrically and concentrically disposed about the central axis of the display panel.

8. The display device of claim 7, wherein the Fresnel structure comprises a plurality of second inclined surfaces facing away from the central axis, and tilt angles of the plurality of second inclined surfaces increase along a direction from the central axis outward.

9. The display device of claim 1, wherein the optical film is combined with the display panel.

10. A multi-display apparatus, comprising:
a plurality of display devices disposed adjacent to each other on a plane, each display device comprising:
   a display panel comprising a central axis, a display area and a non-display area disposed outside the display area;
   an optical film disposed near one side of the display panel, the optical film comprising a microstructure configured to diverge the incident light into the display panel thereby a portion of the incident light near the border between the display area and the non-display area is redirected to travel over the non-display area; and
   a convex lens disposed near the other side of the display panel, the convex lens comprising a Fresnel structure and being configured to converge output light from the display panel thereby the output light is redirected to travel approximately parallel to the central axis;
   wherein the microstructure comprising a plurality of first inclined surfaces is formed on a surface of the optical film facing away from the display panel and a planar surface is disposed on the other opposite surface of the optical film, and tilt angles $\theta_f$ of the plurality of the first inclined surfaces are determined using the following equation:

$$\tan\theta_R = \frac{L}{F-A}$$
$$n_{air} \times \sin\theta_R = n \times \sin\theta_g$$
$$n_{air} \times \sin\theta_i = n \times \sin\theta_2$$
$$\theta_f = \theta_1 + \theta_2$$

where $n_{air}$ is the refractive index of air, n is the refractive index of the optical film, L is a distance measured between a location of light leaving the optical film and the central axis, F is the focal length of the convex lens, A is a distance between the optical film and the convex lens, $\theta_i$ is a first incident angle of light entering the first inclined surface, $\theta_2$ is a first refraction angle of light refracted through the first inclined surface, $\theta_1$ is a second incident angle of light incident on the planar surface, and $\theta_R$ is a second refraction angle of light refracted through the planar surface.

11. A display device, comprising:
a display panel comprising a central axis, a display area and a non-display area disposed outside the display area;
an optical film disposed near one side of the display panel, the optical film comprising a microstructure configured to diverge the incident light into the display panel thereby a portion of the incident light near the border between the display area and the non-display area is redirected to travel over the non-display area; and
a convex lens disposed near the other side of the display panel, the convex lens comprising a Fresnel structure and being configured to converge the output light from the display panel thereby the output light is redirected to travel approximately parallel to the central axis;
wherein the microstructure comprising a plurality of first inclined surfaces is formed on a surface of the optical film facing toward the display panel, and a planar surface is disposed on the other opposite surface of the optical film, and tilt angles of the plurality of the first inclined surfaces are determined using the following equation:

$$\tan\theta_R = \frac{L}{F-A}$$
$$n_{air} \times \sin\theta_3 = n \times \sin\theta_g$$
$$n_{air} \times \sin\theta_i = n \times \sin\theta_2$$
$$\theta_3 = \theta_R + \theta_f$$
$$\theta_g = \theta_2 + \theta_f$$

where $n_{air}$ is the refractive index of air, n is the refractive index of the optical film, L is a distance measured between a location of light leaving the optical film and the central axis, F is the focal length of the convex lens, A is a distance between the optical film and the convex lens, $\theta_f$ represents the tilt angle of the first inclined surface, $\theta_i$ is a first incident angle of light entering the planar surface, $\theta_2$ is a first refraction angle of light refracted through the planar surface, $\theta_g$ is a second incident angle of light incident on the first inclined surface, $\theta_3$ is a second refraction angle of light refracted through the first inclined surface, and $\theta_R$ is an angle between a direction of light emitted from the first inclined surface and the central axis.

12. The display device of claim 11, wherein the optical film is a Fresnel concave lens.

13. The display device of claim 12, wherein the optical film comprises a virtual focus, and the convex lens comprises a focus, wherein the virtual focus is substantially coincident with the focus.

14. The display device of claim 11, wherein a pitch of the microstructure is in the range of from 10 to 50 micrometers, and a pitch of the Fresnel structure is in the range of from 10 to 50 micrometers.

15. The display device of claim 11, further comprising a backlight module having a diffusion film and a light source, wherein the optical film is within the backlight module and is between the diffusion film and the light source.

16. The display device of claim 11, wherein the microstructure comprises a plurality of first inclined surfaces concentrically disposed about and facing toward the central axis of the display panel, and tilt angles of the plurality of the first inclined surfaces relative to a horizontal plane of the optical film increase along a direction from the central axis outward.

17. The display device of claim 11, wherein the Fresnel structure is symmetrically and concentrically disposed about the central axis of the display panel.

18. The display device of claim 17, wherein the Fresnel structure comprises a plurality of second inclined surfaces facing away from the central axis, and tilt angles of the plurality of second inclined surfaces increase along a direction from the central axis outward.

19. The display device of claim 11, wherein the optical film is combined with the display panel.

20. A multi-display apparatus, comprising:
a plurality of display devices disposed adjacent to each other on a plane, each display device comprising:
   a display panel comprising a central axis, a display area and a non-display area disposed outside the display area;
   an optical film disposed near one side of the display panel, the optical film comprising a microstructure configured to diverge the incident light into the display panel thereby a portion of the incident light near the border between the display area and the non-display area is redirected to travel over the non-display area; and a convex lens disposed near the other side of the display panel, the convex lens comprising a Fresnel structure and being configured to converge output light from the display panel thereby the output light is redirected to travel approximately parallel to the central axis;

wherein the microstructure comprising a plurality of first inclined surfaces is formed on a surface of the optical film facing toward the display panel, and a planar surface is disposed on the other opposite surface of the optical film, and tilt angles of the plurality of the first inclined surfaces are determined using the following equation:

$$\tan\theta_R = \frac{L}{F-A}$$

$$n_{air} \times \sin\theta_3 = n \times \sin\theta_g$$

-continued $$n_{air} \times \sin\theta_i = n \times \sin\theta_2$$

$$\theta_3 = \theta_R + \theta_f$$

$$\theta_g = \theta_2 + \theta_f$$

where $n_{air}$ is the refractive index of air, n is the refractive index of the optical film, L is a distance measured between a location of light leaving the optical film and the central axis, F is the focal length of the convex lens, A is a distance between the optical film and the convex lens, $\theta_f$ represents the tilt angle of the first inclined surface, $\theta_i$ is a first incident angle of light entering the planar surface, $\theta_2$ is a first refraction angle of light refracted through the planar surface, $\theta_g$ is a second incident angle of light incident on the first inclined surface, $\theta_3$ is a second refraction angle of light refracted through the first inclined surface, and $\theta_R$ is an angle between a direction of light emitted from the first inclined surface and the central axis.

* * * * *